US012584773B2

(12) United States Patent
Bian et al.

(10) Patent No.:     US 12,584,773 B2
(45) Date of Patent:        Mar. 24, 2026

(54) SENSOR MODULE

(71) Applicants: TE Connectivity Solutions GmbH, Schaffhausen (CH); Tyco Electronics (Shanghai) Co., Ltd., Shanghai (CN)

(72) Inventors: Weifeng Bian, Shanghai (CN); Lei Pan, Shanghai (CN); Jiang Wang, Shanghai (CN); Yongyao Cai, Schaffhausen (CH); Stephen Descioli, Schaffhausen (CH); Richard T. Shell, Schaffhausen (CH); Nicholas Langston, Schaffhausen (CH)

(73) Assignees: Tyco Electronics (Shanghai) Co., Ltd., Shanghai (CN); TE Connectivity Solutions GmbH, Schaffhausen (CH)

( * ) Notice: Subject to any disclaimer, the term of this patent is extended or adjusted under 35 U.S.C. 154(b) by 313 days.

(21) Appl. No.: 18/354,194

(22) Filed: Jul. 18, 2023

(65)            Prior Publication Data

US 2024/0019283 A1      Jan. 18, 2024

(30)        Foreign Application Priority Data

Jul. 18, 2022    (CN) ......................... 202210855825.6

(51) Int. Cl.
| | |
|---|---|
| *G01D 21/02* | (2006.01) |
| *G01D 11/24* | (2006.01) |
| *G01F 23/14* | (2006.01) |
| *G01N 21/53* | (2006.01) |

(52) U.S. Cl.
CPC ........... *G01D 21/02* (2013.01); *G01D 11/245* (2013.01); *G01F 23/14* (2013.01); *G01N 21/534* (2013.01)

(58) Field of Classification Search
CPC ...... G01D 21/02; G01D 11/245; G01F 23/14; G01N 21/534
See application file for complete search history.

(56)              References Cited

U.S. PATENT DOCUMENTS

2021/0251464 A1 *    8/2021   Durham .............. A47L 15/4246
2023/0074219 A1 *    3/2023   Pan ........................ G01K 13/02

FOREIGN PATENT DOCUMENTS

CN          209542593 U   * 10/2019
CN          115752554 A   *  3/2023   ............. G01K 13/02
CN          116105787 A   *  5/2023   ............. G01D 21/02

* cited by examiner

*Primary Examiner* — Jamel E Williams
(74) *Attorney, Agent, or Firm* — Barley Snyder

(57)            ABSTRACT

A sensor module comprises a housing and a liquid level sensing module. The housing includes a first passage adapted to permit liquid to flow into an interior of the housing. The first passage defines an air chamber and an air passage in communication with the air chamber. The liquid level sensing module is arranged in the interior of the housing, and includes at least a first part positioned within the air passage. The liquid level sensing module is adapted to sense a characteristic indicative of a liquid level when the liquid flows into the first passage and compresses air in the air passage.

21 Claims, 4 Drawing Sheets

SENSOR MODULE

CROSS-REFERENCE TO RELATED APPLICATIONS

This application claims the benefit of Chinese Patent Application No. 202210855825.6, filed Jul. 18, 2022, the whole disclosure of which is incorporated herein by reference.

FIELD OF THE INVENTION

Embodiments of the present disclosure relate to the technical field of sensors, and more specifically to a sensor module.

BACKGROUND

In existing intelligent cleaning systems (e.g., intelligent washing machines, dishwashers, and floor scrubbers), there are liquid level sensors, conductivity sensors, turbidity sensors, and temperature sensors independently installed in different positions. In these systems, the liquid level sensor is typically fixed proximate to a liquid flow path. An air duct transmits liquid pressure to an air passage of the liquid level sensor to detect the height of the liquid level. A measuring part of the turbidity sensor is inserted into the liquid flow path to detect the turbidity level of the liquid. The temperature sensor also needs to be fixed in the liquid flow path to detect the temperature of the liquid. These sensors are respectively connected to a control system through distinct wiring. The control system automatically sets the cleaning mode of the system according to the measurements or outputs of these three sensors. According to prior art systems, these sensors are independently installed in different positions, which complicates system wiring and structure, in addition to occupying a relatively large amount of system space.

SUMMARY

According to an embodiment of the present disclosure, a sensor module comprises a housing and a liquid level sensing module. The housing includes a first passage adapted to permit liquid to flow into an interior of the housing. The first passage defines an air chamber and an air passage in communication with the air chamber. The liquid level sensing module is arranged in the interior of the housing, and includes at least a first part positioned within the air passage. The liquid level sensing module is adapted to sense a characteristic indicative of a liquid level when the liquid flows into the first passage and compresses air in the air passage.

BRIEF DESCRIPTION OF THE DRAWINGS

The invention will now be described by way of example with reference to the accompanying Figures, of which.

DETAILED DESCRIPTION OF THE EMBODIMENTS

Figure 1:
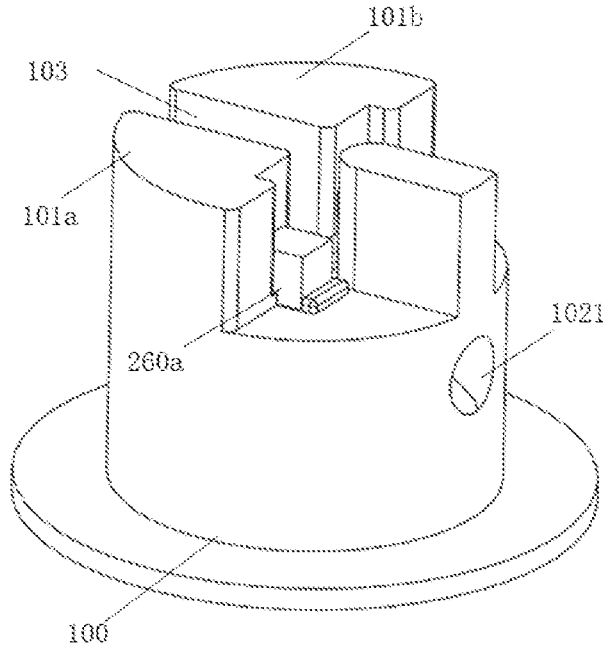
FIG. 1 is a schematic perspective view of a sensor module according to the present disclosure.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Sensor modules according to embodiments of the present disclosure are adapted to achieve multiple functions, such as liquid level detection, liquid level leakage detection, and liquid turbidity detection while reducing integration difficulty and improving reliability compared to sensor arrangements of the prior art. Embodiments of the present disclosure include a sensor module which at least comprises a housing and a liquid level sensing module. The housing is provided with a first passage that allows liquid to flow into an interior of the housing. The first passage includes an air chamber and an air passage communicating with the air chamber. The liquid level sensing module is arranged in the interior of the housing, and a part of the liquid level sensing module is arranged in the first passage. The liquid level sensing module is used to sense a liquid level when the liquid flows into the first passage and compresses air in the first passage. A first conductivity sensing module is arranged on the outer surface of the housing, and is used to sense a conductivity of the liquid when the fluid flows across the outer surface of the housing. A turbidity sensing module is arranged in the interior of the housing and is used to sense a turbidity of the liquid. A temperature sensing module is arranged on the inner wall of the housing and is used to sense a temperature of the liquid.

Figure 2:
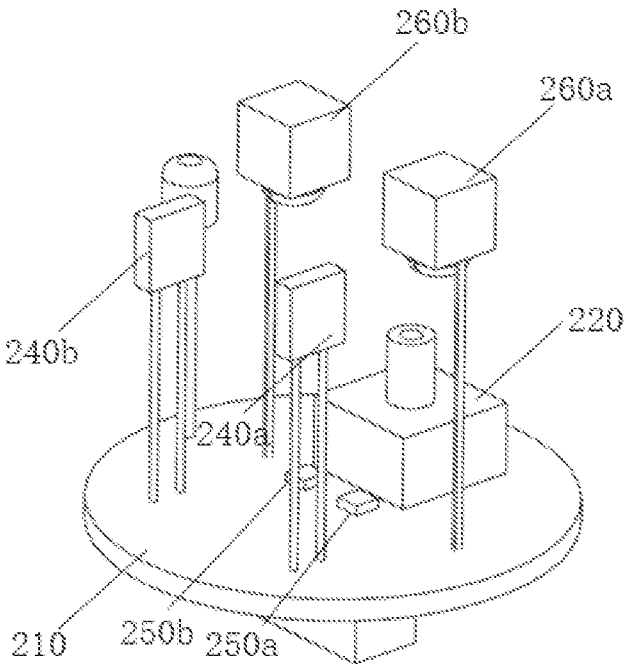
FIG. 2 is a schematic diagram of the internal structure of the sensor module according to the present disclosure.
Figure 3:
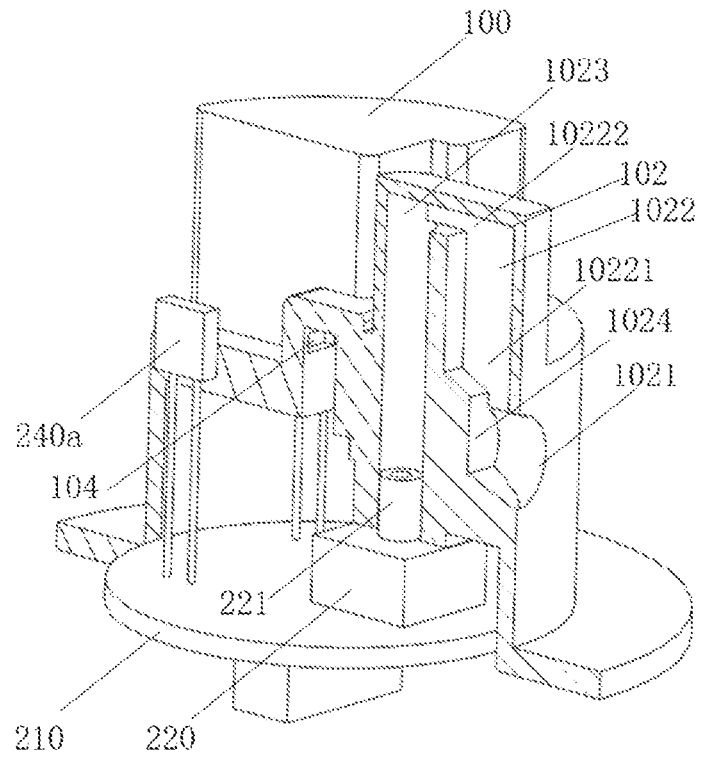
FIG. 3 is a first cross-sectional view of the sensor module according to the present disclosure.

FIG. 1 shows the overall structure of a sensor module according to a first embodiment, FIG. 2 shows the internal structure of the sensor module of FIG. 1, and FIG. 3 shows a partially sectioned view of the sensor module of this embodiment.

As shown in FIG. 1 and FIG. 2, the sensor module includes a housing 100 and electronic devices arranged inside the housing 100. As shown in FIG. 1 and FIG. 3, in this embodiment, a first passage 102 is provided in the housing 100 that allows liquid to flow into an interior of the housing. A second passage 103 is formed on the housing 100 and is adapted to allow the liquid to flow therethrough, as well as allow a turbidity sensing module to sense turbidity characteristics associated with the liquid. In addition, in this embodiment, the first passage 102 includes an inlet 1021, an air chamber 1022 and an air passage 1023. Specifically, the air chamber 1022 is in communication with the inlet 1021 and the air passage 1023. Further, the housing 100 includes at least two transparent parts 101*a* and 101*b*. The transparent parts 101*a* and 101*b* are arranged on two sides of the second passage 103 to allow light to pass through the transparent part 101*a*, the second passage 103, and the transparent part 101*b*. In this embodiment, the air chamber 1022 includes a first part 10221 that is parallel to the air passage 1023, and a second part 10222 that provides communication between the air passage 1023 with the first part of the air chamber. In addition, in this embodiment, a first slope structure 1026 is provided at the connection portion between the air chamber 1022 and the inlet 1021. Specifically, the first slope structure 1026 is provided at the connection portion between the first part 10221 and the inlet 1021.

As shown in FIG. 2 and FIG. 3, a circuit board 210 is arranged in a lower part of the housing 100. In this way, the circuit board 210 is combined with or forms a part of, the housing 100. A liquid level sensing module 220 is arranged in the interior of the housing 100. A part of the liquid level sensing module 220 is arranged in the air passage 1023 of the first passage 102. The turbidity sensing module and a second conductivity sensing module are also arranged in the interior of the housing 100. A first conductivity sensing module is arranged outside the housing 100, and a temperature sensing module is arranged on the inner wall of the housing. In addition, the liquid level sensing module 220, the turbidity sensing module, the second conductivity sensing module, the first conductivity sensing module, and the temperature sensing module are all electrically connected to the circuit board 210.

In the exemplary embodiment, the air passage 1023 is slightly larger than an air duct 221 of the liquid level sensing module 220, so that the air duct is arranged in the air passage. This facilitates the integral forming of the liquid level sensing module 220 and the housing 100. In this way, it can be ensured that the liquid flowing into the housing 100 from the first passage 102 does not flow into other locations inside the housing.

The first passage 102 serves as an air trap and allows the air outside the sensor module to reach the liquid level sensing module 220. Specifically, the liquid can enter the vertical air passage 1023 through the inlet 1021 and the air chamber 1022. The structure of the combination of the air chamber 1022 and the air passage 1023 expands the range of liquid level height that the liquid level sensing module 220 can sense. The first slope structure 1026 helps the liquid to flow out of the housing 100 through the inlet 1021. Further, since the sensor module is used in dirty liquid, the first slope structure 1026 can reduce the accumulation of sediment in the liquid inside the housing 100.

The liquid level sensing module 220 is configured to sense liquid level information when the liquid flows into the first passage 102 and compresses the air in the first passage 102. For example, as the external liquid continuously flows into the first passage 102, the liquid compresses the air in the first passage, the air pressure thereby continues to increase, and the value of the liquid level height sensed by the liquid level sensing module 220 also continues to increase.

The turbidity sensing module includes a light emitting unit 240*a* and a light receiving unit 240*b*. The light emitting unit 240*a* and the light receiving unit 240*b* are arranged on two sides of the second passage 103 and are opposite to each other. Specifically, the light emitting unit 240*a* is arranged in the transparent part 101*a*, and the light receiving unit 240*b* is arranged in the transparent part 101*b*, thereby allowing the light emitted by the light emitting unit 240*a* to pass through the housing 100 and the second passage 103 and be received by the light receiving unit 240*b*. It should be appreciated that the whole housing 100 may be transparent. In addition, the housing 100 may be opaque, but includes a first opening and a second opening paired with the first opening. The first opening and the second opening are located on two sides of the second passage 103, and run through the housing 100. When the turbidity sensing module is installed in the housing 100, the light emitting unit 240*a* and the light receiving unit 240*b* are sealingly installed at the first and second openings. When liquid (such as water) flows into the second passage 103, the light emitted by the light emitting unit 240*a* can pass through the first opening and the second passage, and be received by the light receiving unit 240*b* through the second opening. In an embodiment, the light receiving unit 240*b* receives a signal of light intensity and converts it into a signal characterizing turbidity.

The first conductivity sensing module includes a pair of conductive metal blocks 260*a* and 260*b*. Both the conductive metal blocks 260*a* and 260*b* are arranged on the outer surface of the housing 100, and are integrated with the circuit board 210. For example, the first conductivity sensing module is welded to the circuit board to sense the conductivity information (i.e., the conductivity information that characterizes the concentration of conductive ions in the liquid) of the liquid when the liquid flows across the outer surface of the housing 100 and submerges the conductive metal blocks 260*a* and 260*b* to characterize the state of the liquid. Specifically, the measuring part of the first conductivity sensing module is immersed in the liquid flow path to detect the conductivity status of the liquid. For example, for a washing machine, the conductivity information can be used to determine whether laundry detergent or washing powder needs to be added.

The second conductivity sensing module includes a pair of conductive metal blocks 250*a* and 250*b*. Both the conductive metal blocks 250*a* and 250*b* are arranged on the circuit board 210. For example, the second conductivity sensing module is welded to the circuit board to sense the conductivity information (i.e., the conductivity information that characterizes the concentration of conductive ions in the liquid) of the liquid when the liquid leaks into the interior of the housing 100 and flows across the conductive metal blocks 250*a* and 250*b* to characterize the leakage state of the liquid. The temperature sensing module is installed on the inner wall of the housing 100 and is used to sense the temperature information of the liquid flowing across the housing 100 and transmit the temperature information through the circuit board 210.

The circuit board 210 serves as a signal transmission unit and is coupled with the light emitting unit 240*a* and the light receiving unit 240*b*, to transmit the signal, characterizing turbidity, converted by the light receiving unit 240*b*. Similarly, the circuit board 210 is coupled with the liquid level sensing module 220, the first conductivity sensing module, the second conductivity sensing module, and the temperature sensing module, to respectively transmit the liquid level information, the liquid leakage information, the liquid conductivity information, and the liquid temperature information.

In this embodiment, the volume of the first part 10221 of the air chamber 1022 (i.e., the part parallel to the air passage 1023) is greater than or equal to the volume of the air passage 1023. In practical use, the air capacity of the first part 10221 of the air chamber 1022 is much larger than that of the air passage 1023. The larger the volume of the first part 10221 of the air chamber 1022 is, the lower the risk of liquid entering the air passage 1023. In other application scenarios, the volume of the first part 10221 of the air chamber 1022 can also be reduced to the same volume as the air passage 1023, as long as there is no risk of liquid entering the air passage 1023.

In this embodiment, the liquid temperature information is used to rectify the turbidity information and the conductivity information of the liquid, and also to determine whether the liquid temperature of the product is acceptable. The sensor module disclosed in this embodiment integrates multiple functions (such as information sensing about liquid level, turbidity, leakage, and temperature) together, facilitating modular design and reducing costs.

Figure 4A:
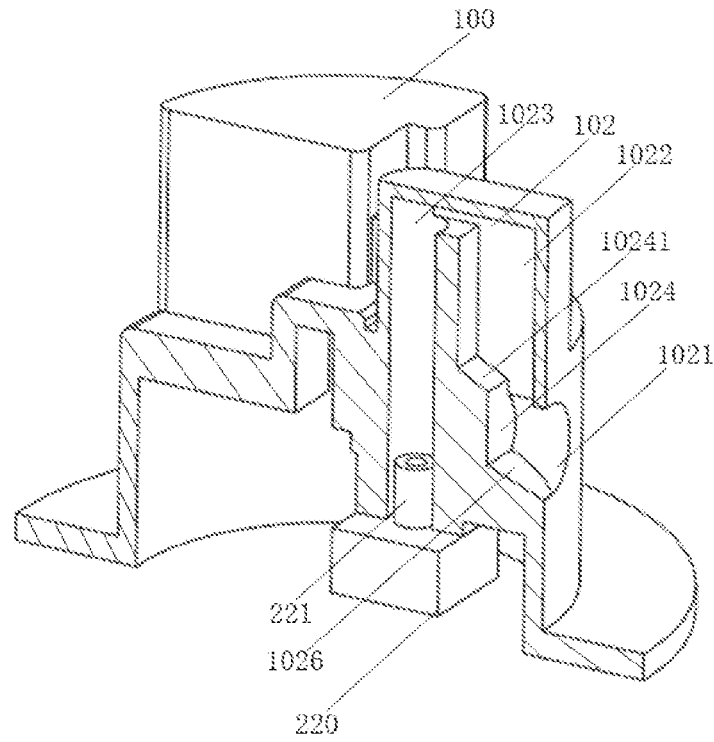
FIGS. 4*a*, 4*b* and 4*c* are second cross-sectional views of the sensor module according to the present disclosure.
Figure 4B:
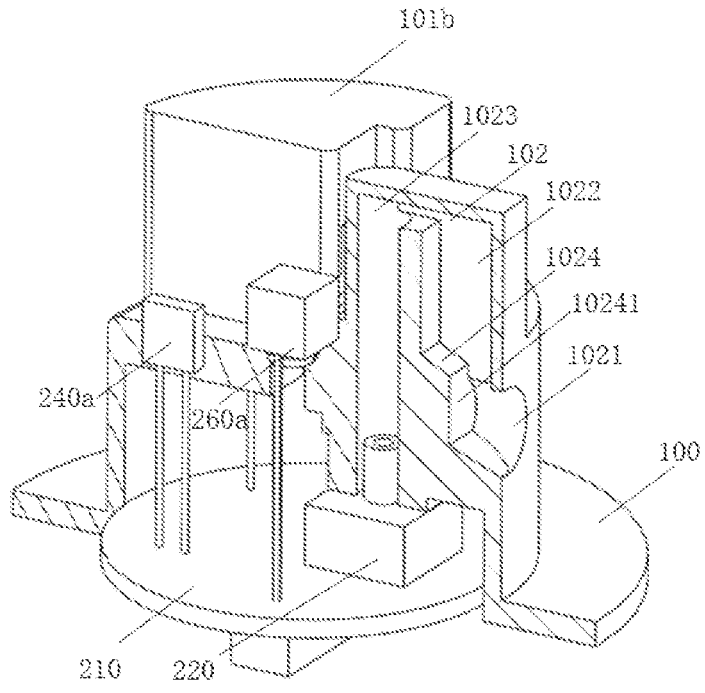

The structure and function of the electronic devices of a sensor module according to a second embodiment of the present disclosure are similar to those set forth above in the first embodiment and FIG. 2, and will not be repeated here. As shown in FIG. 4*a* and FIG. 4*b*, in the second embodiment, the first passage 102 of the housing 100 includes an inlet 1021, an air chamber 1022, an air passage 1023 and a water blocking component 1024. The connection relations between the air chamber 1022, the inlet 1021, and the air passage 1023 are similar to those in the first embodiment, and will not be repeated herein.

In this embodiment, the water blocking component 1024 is arranged in the air chamber 1022 and corresponds in position to the inlet 1021 of the first passage 102. Specifically, the water blocking component 1024 is arranged on the slope structure 1026 to prevent turbulent liquid from entering the air chamber 1022, in order to increase the air inside the air chamber 1022 as much as possible and improve the sensing accuracy of the liquid level sensing module 220. More specifically, the water blocking component 1024 is arranged in the air chamber 1022, and is higher than the upper edge of the inlet 1021 of the first passage 102, so as to effectively prevent turbulent liquid from entering the air chamber 1022. In addition, as shown in FIG. 4*a*-FIG. 4*c*, the water blocking component 1024 is further provided with a second slope structure 10241 which can further reduce the accumulation of sediment in the liquid.

Figure 4C:
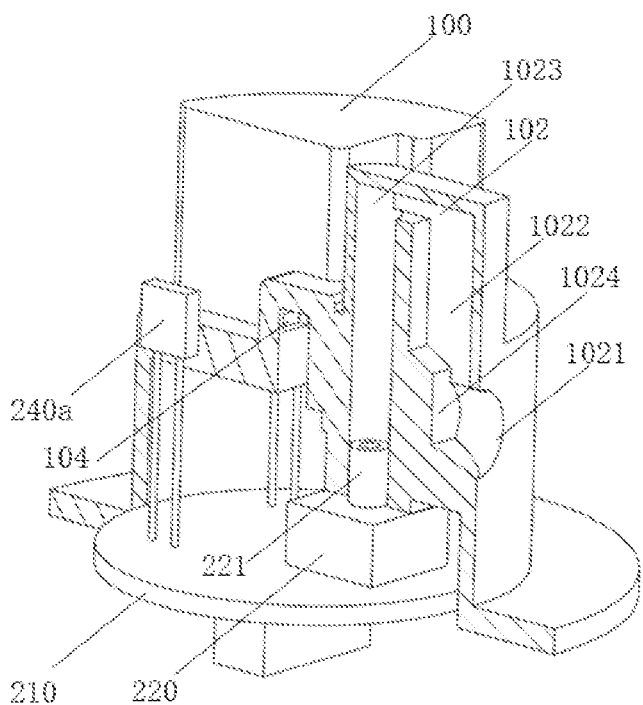

In this embodiment, FIG. 4*c* further shows that the temperature sensing module is arranged at position 104 on the inner wall of the housing 100, so that the temperature sensing module (such as a thermocouple) can sense the temperature of the liquid flowing outside the housing 100. In addition, the temperature sensing module can be arranged at other position on the inner wall corresponding to a position, on the housing, in contact with the liquid, which is not limited herein.

Other structures, components, and working principles of the sensor module disclosed in this embodiment are similar to those in the first embodiment, and will not be repeated here.

The sensor module disclosed in this embodiment can achieve the integration of multiple functions, and can also improve the reliability of the sensor module by means of the unique design of the air passage and the air chamber.

Figure 5:
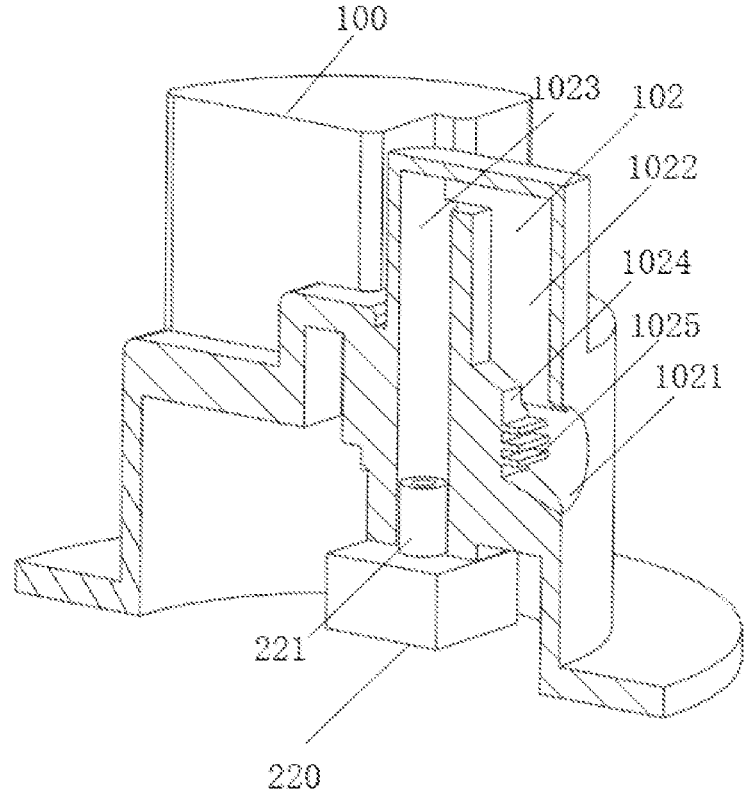
FIG. 5 is a third cross-sectional view of the sensor module according to the present disclosure.

As shown in FIG. 5, according to a sensor module according to a third embodiment, the above-described first passage 102 of the housing 100 further includes one or more protrusion structures 1025. Specifically, in this embodiment, the water blocking component 1024 is provided with one or more protrusion structures 1025 to reduce the impact of surges of the liquid on the air chamber 1022. Increasing the amount of air entering the first passage 102 can improve the sensing accuracy of the liquid level sensing module 220.

Other structures, components, and working principles of the sensor module disclosed in this embodiment are similar to those in the first embodiment, and will not be repeated here.

The sensor module disclosed in the present embodiments reduces the difficulty of integrating multiple sensing modules through the specific structure of the housing, ensures the airtightness of the product through the integral forming of the housing and the sensing modules (such as the liquid level sensing module), ensures the reliability of the product through the structural design of the housing, and reduces the manufacturing cost of the product.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A sensor module, comprising:
a housing including a first passage adapted to permit the flow of liquid into an interior of the housing, the first passage having an air chamber and an air passage in communication with the air chamber, the air passage is parallel to a first part of the air chamber and is in communication with a second part of the air chamber; and
a liquid level sensing module arranged in the interior of the housing and at least partially in the air passage, the liquid level sensing module adapted to sense a characteristic indicative of a liquid level when the liquid flows into the first passage and compresses air in the air passage.

2. The sensor module according to claim 1, wherein the air passage is arranged above the liquid level sensing module and accommodates a part of the liquid level sensing module.

3. The sensor module according to claim 2, wherein a volume of the first part of the air chamber is greater than or equal to a volume of the air passage.

4. The sensor module according to claim 1, further comprising a circuit board arranged in the housing and operatively connected to the liquid level sensing module.

5. The sensor module according to claim 4, further comprising a first conductivity sensing module arranged on an outer surface of the housing and connected to the circuit board, the first conductivity sensing module adapted to sense a characteristic indicative of a conductivity of the liquid as the fluid flows across the outer surface of the housing.

6. The sensor module according to claim 5, further comprising a second conductivity sensing module arranged in the interior of the housing and connected to the circuit board, the second conductivity sensing module adapted to sense a characteristic indicative of liquid leakage when the liquid leaks into the interior of the housing.

7. The sensor module according to claim 4, further comprising a turbidity sensing module arranged in the interior of the housing and connected to the circuit board, the turbidity sensing module adapted to sense a characteristic indicative of a turbidity of the liquid.

8. The sensor module according to claim 7, wherein the turbidity sensing module includes a light emitting unit and a light receiving unit arranged in the interior of the housing and opposite to each other, the housing adapted to allow light emitted from the light emitting unit to pass through the housing and be received by the light receiving unit.

9. The sensor module according to claim 8, wherein the housing includes at least two transparent parts, the light emitting unit arranged in one of the transparent parts and the light receiving unit arranged in the other transparent part.

10. The sensor module according to claim 4, further comprising a temperature sensing module arranged on an inner wall of the housing and connected to the circuit board, the temperature sensing module adapted to sense a temperature the liquid.

11. The sensor module according to claim 1, wherein the air chamber is in communication with an inlet of the first passage, and a first slope structure is provided at a connection portion between the air chamber and the inlet.

12. The sensor module according to claim 11, wherein the first passage further comprises a water blocking component arranged in the air chamber and extending toward the inlet of the first passage, the water blocking component extending within the air chamber to a height greater than an upper edge of the inlet of the first passage.

13. The sensor module according to claim 12, wherein the water blocking component defines with one or more protrusion structures extending in a direction toward the inlet of the first passage.

14. The sensor module according to claim 12, wherein the water blocking component is defines a second slope structure.

15. The sensor module according to claim 1, wherein the housing is integrally formed with the liquid level sensing module.

16. A sensor module, comprising:
a housing including a first passage adapted to allow liquid to flow into an interior of the housing, the first passage having an air chamber and an air passage in communication with the air chamber;
a circuit board arranged within the housing;
a liquid level sensing module connected to the circuit board and arranged at least one of in or on the housing with at least a portion thereof exposed to the air passage;

a first conductivity sensing module arranged at least one of in or on the housing;
a turbidity sensing module arranged at least one of in or on the housing; and
a temperature sensing module arranged at least one of in or on the housing.

17. The sensor module according to claim 16, wherein:
the first conductivity sensing module, the turbidity sensing module and the temperature sensing module are each operatively connected to the circuit board;
the first conductivity sensor is arranged on an outer surface of the housing;
the turbidity sensing module is arranged in the interior of the housing; and
the temperature sensing module is arranged in the interior of the housing.

18. The sensor module according to claim 16, wherein the turbidity sensing module includes a light emitting unit and a light receiving unit arranged in the interior of the housing and opposite to each other, the housing adapted to permit light emitted from the light emitting unit to pass through the housing and be received by the light receiving unit.

19. The sensor module according to claim 18, wherein the housing includes at least two transparent parts, the light emitting unit arranged in one of the transparent parts and the light receiving unit arranged in the other transparent part.

20. A sensor module, comprising:
a housing including a first passage adapted to permit the flow of liquid into an interior of the housing, the first passage having an air chamber and an air passage in communication with the air chamber;
a liquid level sensing module arranged in the interior of the housing and at least partially in the air passage, the liquid level sensing module adapted to sense a characteristic indicative of a liquid level when the liquid flows into the first passage and compresses air in the air passage; and
a circuit board arranged in the housing and operatively connected to the liquid level sensing module.

21. A sensor module, comprising:
a housing including a first passage adapted to permit the flow of liquid into an interior of the housing, the first passage having an air chamber and an air passage in communication with the air chamber, the air chamber is in communication with an inlet of the first passage, and a first slope structure is provided at a connection portion between the air chamber and the inlet, the first passage further comprises a water blocking component arranged in the air chamber and extending toward the inlet of the first passage, the water blocking component extending within the air chamber to a height greater than an upper edge of the inlet of the first passage, the water blocking component defines:
one or more protrusion structures extending in a direction toward the inlet of the first passage; or
a second slope structure; and
a liquid level sensing module arranged in the interior of the housing and at least partially in the air passage, the liquid level sensing module adapted to sense a characteristic indicative of a liquid level when the liquid flows into the first passage and compresses air in the air passage.

* * * * *